US006959309B2

(12) United States Patent
Su et al.

(10) Patent No.: US 6,959,309 B2
(45) Date of Patent: Oct. 25, 2005

(54) INTERFACE BETWEEN PROGRAMMING LANGUAGES AND METHOD THEREFOR

(75) Inventors: Paul Sheng-Chi Su, Austin, TX (US); James Lynch, Austin, TX (US); Samuel J. Rauch, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 426 days.

(21) Appl. No.: 10/066,278

(22) Filed: Jan. 31, 2002

(65) Prior Publication Data

US 2003/0145011 A1 Jul. 31, 2003

(51) Int. Cl.[7] ............................ G06F 17/30; G06F 7/00; G06F 17/00; G06F 9/44; G06N 5/04
(52) U.S. Cl. ..................... 707/200; 707/10; 707/103 R; 706/59; 710/46; 715/500.1; 717/120
(58) Field of Search ..................... 707/200, 10, 103 R; 706/59; 710/46; 715/500.1; 717/120

(56) References Cited

U.S. PATENT DOCUMENTS

| 5,745,902 | A | * | 4/1998 | Miller et al. ................. 707/200 |
| 5,765,169 | A | * | 6/1998 | Conner ........................ 707/200 |
| 6,064,380 | A | * | 5/2000 | Swenson et al. .......... 715/500.1 |
| 6,161,152 | A | * | 12/2000 | Garg et al. .................... 710/46 |
| 6,301,583 | B1 | * | 10/2001 | Zellweger ............... 707/103 R |
| 6,519,594 | B1 | * | 2/2003 | Li ................................ 707/10 |
| 6,611,858 | B1 | * | 8/2003 | Aravamudan et al. ...... 709/203 |
| 2002/0087571 | A1 | * | 7/2002 | Stapel et al. ................. 707/100 |
| 2003/0078902 | A1 | * | 4/2003 | Leong et al. .................. 706/59 |
| 2003/0088783 | A1 | * | 5/2003 | DiPierro ...................... 713/189 |
| 2004/0015855 | A1 | * | 1/2004 | Wallman et al. ............. 717/120 |

OTHER PUBLICATIONS

U. Infinitive Virtually Simultaneous File Opening System, Oyama Tsunehisha, NEC Comm Syst, Sep. 10, 1993.*
A globally accessible file system, Judy T. Reagan, A dissertation submitted to the University of Dublin, in partial fulfillment of the requirements for the degree of Master of Science in Computer Science, 1999.*
Sun Micro, Connected, limited device config., May 19, 2000.
Sun Micro, Mobile Info Device Profile, Sep. 1, 2000.
Sun Micro, Java 2 platform Micro Ed Tech for CMD, May 19, 2000.
"Connected, Limited Device Configuration," Sun Microsystems, May 19, 2000, pp. 1–1 to 6–12.
Connected, Limited Device Configuration, Sun Microsystems, APPENDIX, "Package Java.lang," pp. 1–350.
"Java™ 2 Platform Micro Edition (J2ME™) Technology for Creating Mobile Devices," Sun Microsystems White Paper, May 19, 2000, pp. 1–35.
"Mobile Information Device Profile (JSR–37)," JCP Specification, Java 2 Platform, Micro Edition, 1.0, Sun Microsystems, Inc. Sep. 1, 2000, pp. 1–284.

* cited by examiner

*Primary Examiner*—Mohammad Ali
*Assistant Examiner*—Kuen S. Lu
(74) *Attorney, Agent, or Firm*—Susan C. Hill; Robert L. King

(57) ABSTRACT

An interface implements a file system for supporting Java record and resource management between an operating system using a first programming language other than Java and a suite of Java applications. The interface provides a method for maintaining any number of files to be open in a manner transparent to the Java applications. Location information of a file is put in storage allocated for usage by Java code when a maximum number of open files is exceeded. A table is used to translate between file names of differing length and to identify directories in a manner to provide a hierarchical file system. An identifier is associated with a shortened Java file name in the table to quickly identify an operating system file with a shortened file name.

20 Claims, 5 Drawing Sheets

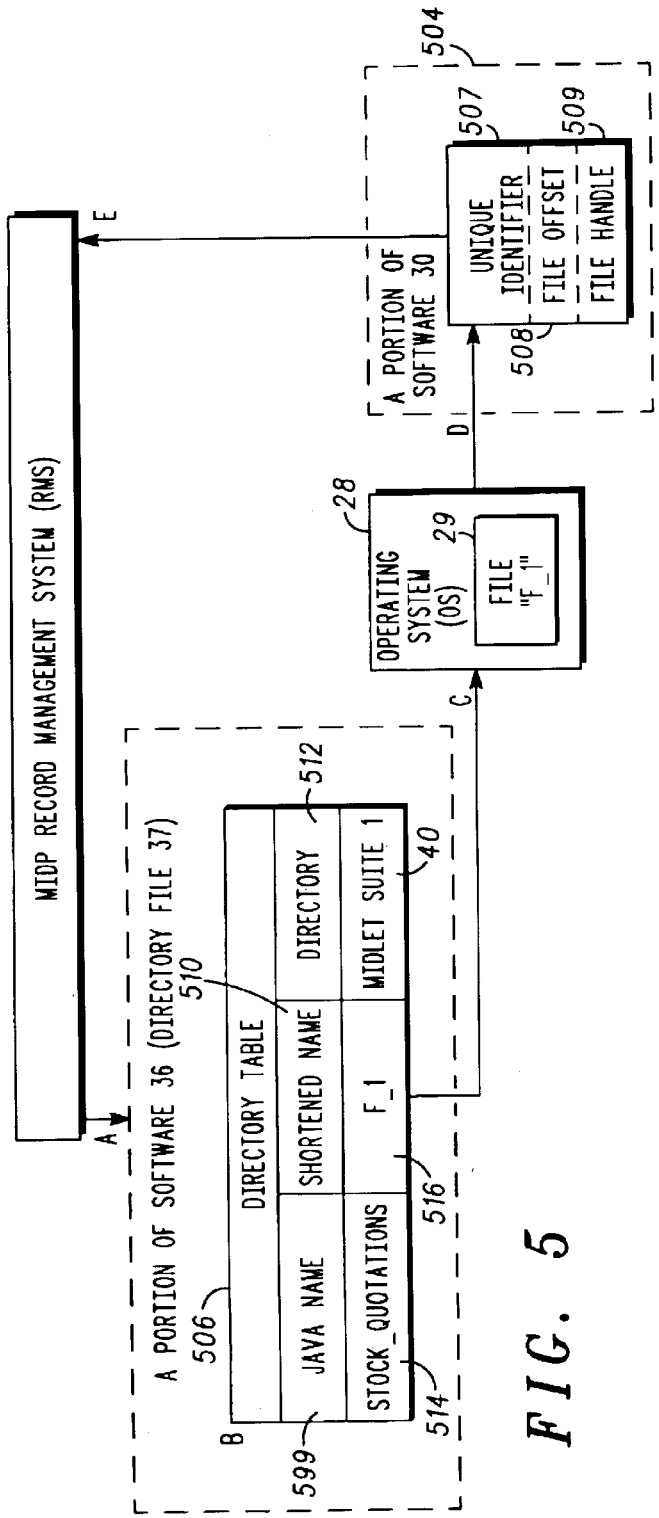

INTERFACE BETWEEN PROGRAMMING LANGUAGES AND METHOD THEREFOR

BACKGROUND OF THE INVENTION

Many devices today, particularly devices that communicate with the internet, utilize more than one programming language. It is thus important to have an efficient interface between the various programming languages used in a device. As an example, an internet capable portable device, such as a cellular phone, might use libraries which are written in Java while the Java virtual machine and the operating systems themselves may be written in a native programming language. The interface between Java and the native programming language may cause slow downs in performance due to inefficiencies in the implementation of the file system to support the Java record and resource management requirements. In addition, limitations within the operating system itself may cause the operating system to not directly allow capabilities which are requirements at a higher software level (e.g. record management systems, resource management, file access, and class loading).

BRIEF DESCRIPTION OF THE DRAWINGS

The present invention is illustrated by way of example and is not limited to the embodiments illustrated in the accompanying figures, in which like references indicate similar elements.

FIG. 5 illustrates, in flow diagram form, one embodiment of a portion of software 20 of FIG. 2 in accordance with the present invention.

FIG. 6 illustrates, in tabular form, a manner in which the steps of FIGS. 3A and 3B and the software portions of FIG. 5 correspond to each other during execution of software 20 in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figure 1:
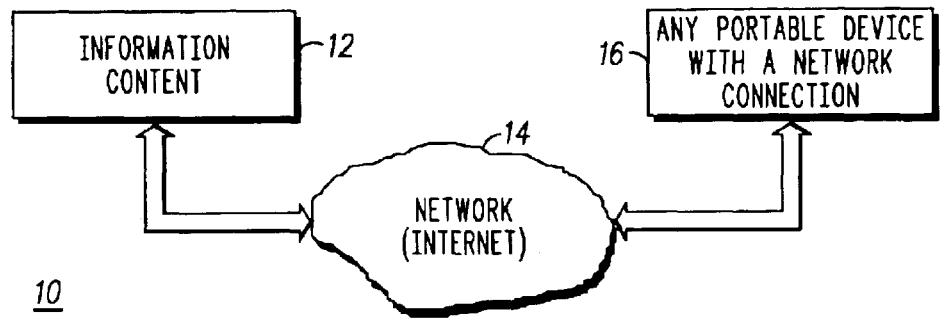
FIG. 1 illustrates, in block diagram form, one embodiment of a system in accordance with the present invention.

FIG. 1 illustrates one embodiment of a system 10 which includes information content 12 that is bi-directionally coupled to a network 14 (e.g. the internet). In one embodiment when network 14 is the internet, information content 12 may include web content, enterprise data, and/or personal data. In alternate embodiments network 14 may be any type of network. Network 14 is also bi-directionally coupled to any portable device with a network connection 16. Note that the connection between device 16 and network 14 may be any type of communications (e.g. electrical, optical) and may or may not require wiring or any other type of physical connector. Thus portable device 16 may include cellular telephones, personal digital assistants, pagers, computers, or any other type of portable device that may be coupled to network 14, whether wireless or not.

Figure 2:
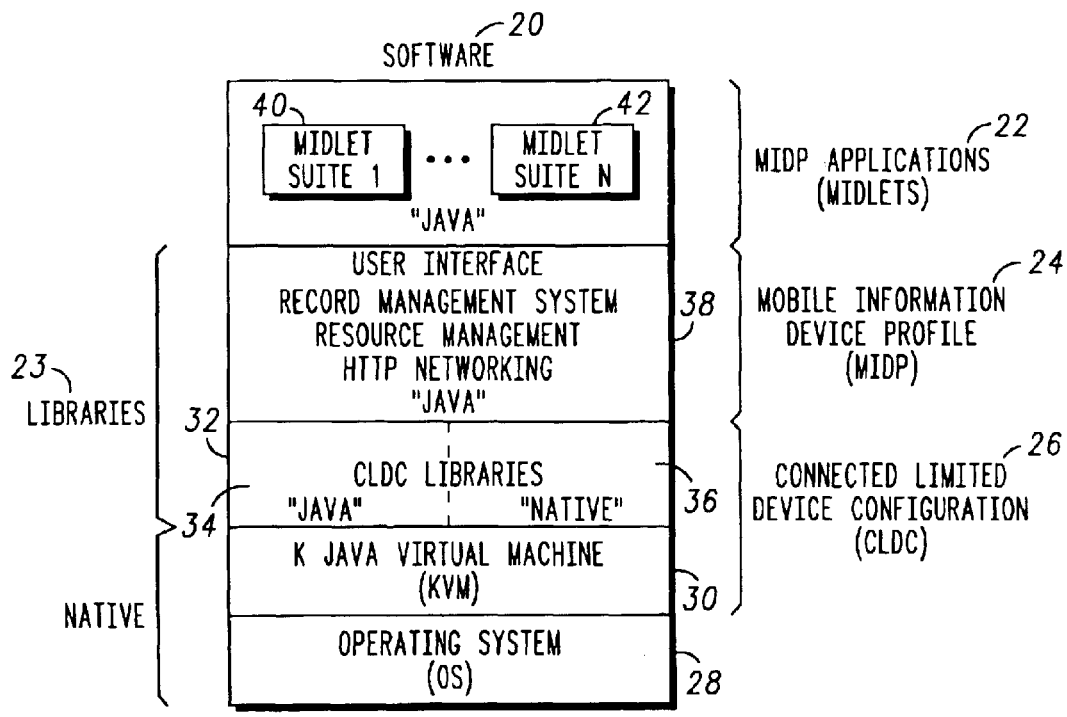
FIG. 2 illustrates, in block diagram form, one embodiment of software which may be used by a device of FIG. 1 in accordance with the present invention.

FIG. 2 illustrates one embodiment of software 20 which may be embedded within portable device 16 (See FIG. 1). In one embodiment software 20 is intended to provide a programming environment which allows portable device 16 to receive and provide information from information content 12 by way of network 14. In particular, the mobile information device profile (MIDP) applications (also called midlets) 22 are portions of software which may be easily exchanged with information content 12 by way of network 14. Applications 22 may also be used for the purpose of establishing a connection to network 14 for the purpose of retrieving information from or providing information to information content 12. In one embodiment applications 22 include a plurality of midlet suites, including midlet suite 1 (40) through midlet suite N (42). In one embodiment of the present invention these applications 22 are written in the Java programming language. Below the applications 22 level of software is a level called libraries 23 which includes software 38 and software 32. Software 38 includes a user interface, a record management system, resource management, and HTTP networking software. In one embodiment of the present invention software 38 complies with the mobile information device profile (MIDP) standard. In one embodiment this MIDP 24 level of software is written in the Java programming language. Libraries 23 also include connected limited device configuration (CLDC) software 32. A first software portion 34 of CLDC libraries 32 is written in the Java programming language. A second portion 36 of the CLDC libraries 32 is written in a native programming language. Note that the term native as used herein means a programming language that is not Java. The third descending level of software includes a K Java virtual machine (KVM) 30.

In one embodiment, both the CLDC libraries 32 and the K Java virtual machine 30 are required to comply with the connected limited device configuration (CLDC) specification. The fourth and final level of software is the operating system (OS) 28. In one embodiment of the present invention the virtual machine 30 and the operating system 28 are written in the native programming language. Note that in alternate embodiments of the present invention, libraries 32 and the virtual machine 30 may conform to any desired configuration, not just the CLDC 26. Similarly, operating system 28 may be any type of operating system. Likewise software 38 may conform to any type of profile 24, not just the MIDP illustrated. Similarly, the applications 22 may conform to a different specification other than that required by MIDP 24. In one embodiment, the software required to implement the present invention is located within software 23 and software 30. Alternate embodiments of the present invention may partition the software between 23 and 30 in any way that is desired.

Figure 3A:
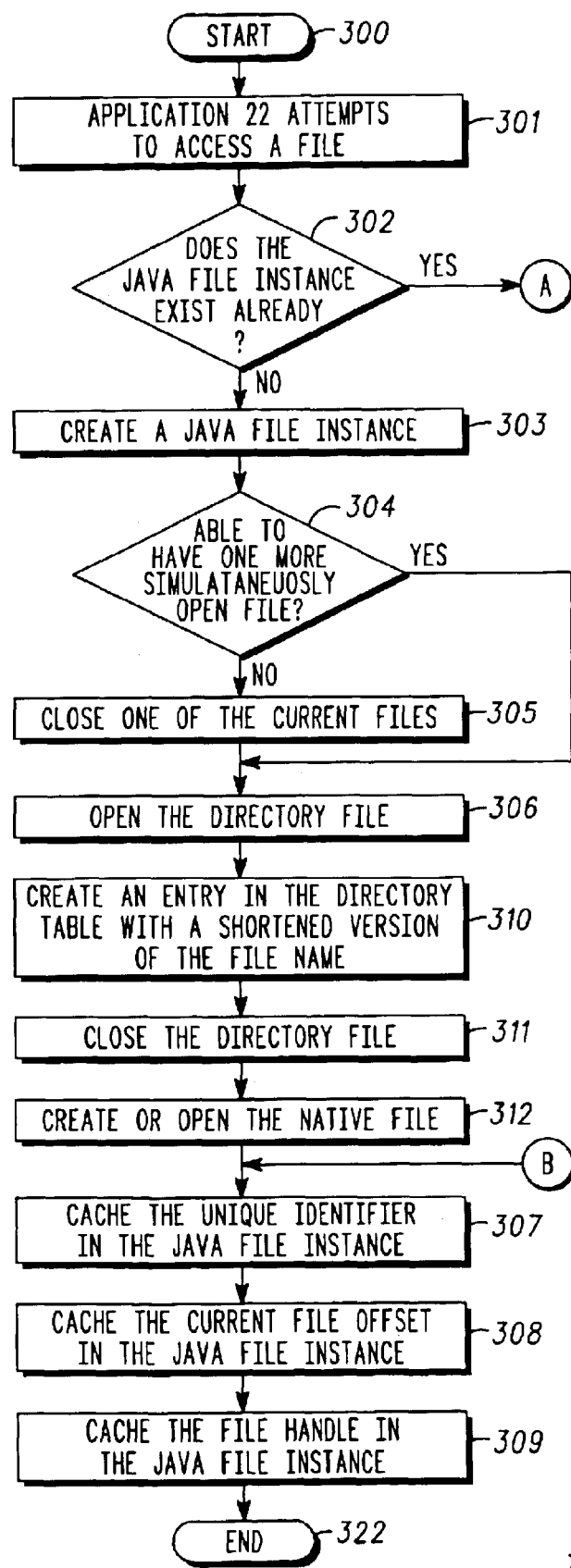
FIGS. 3A and 3B illustrate, in flow diagram form, one embodiment of software for attempting to access a file in accordance with the present invention.
Figure 3B:
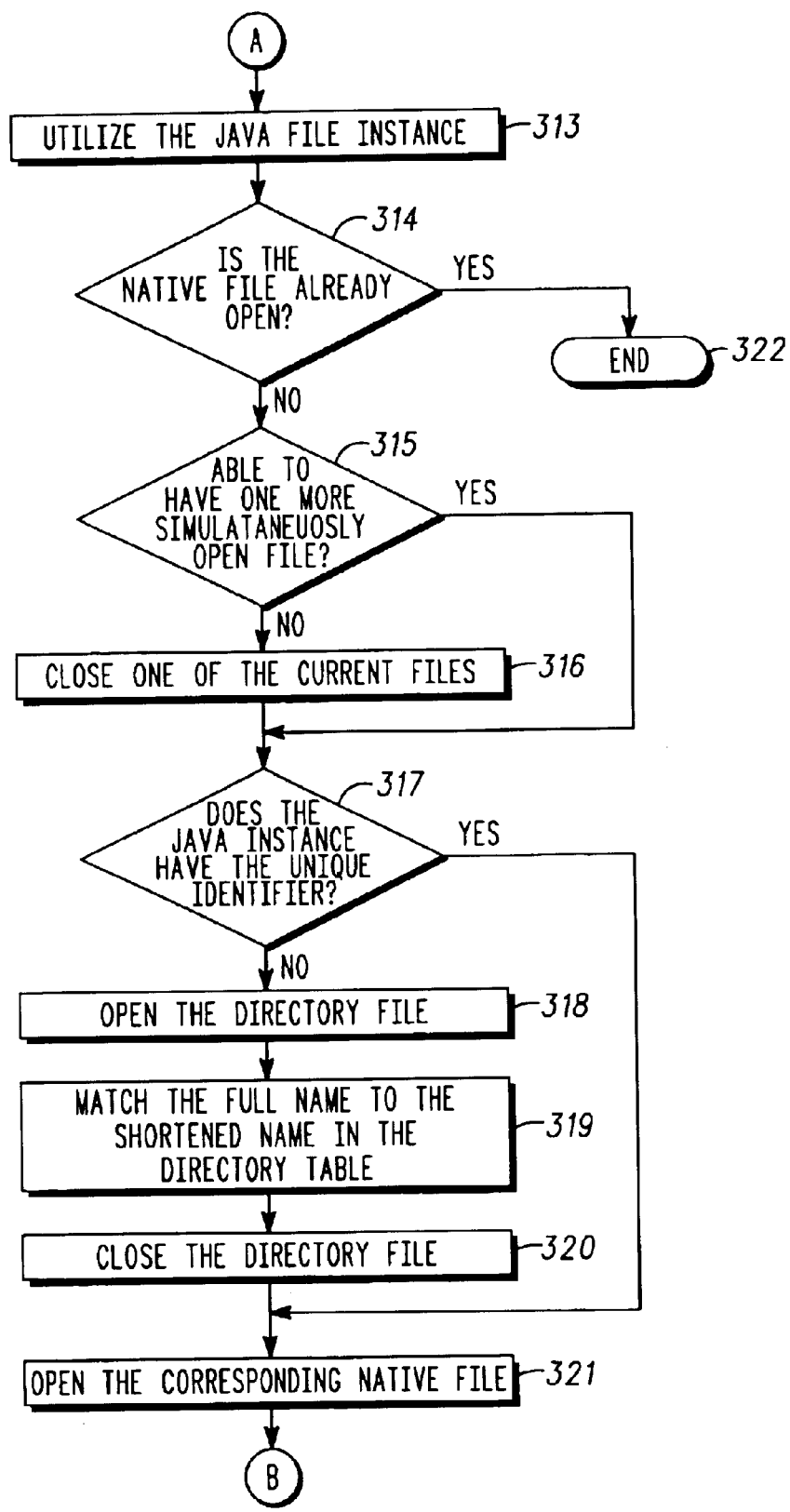

FIGS. 3A and 3B illustrate one way in which application 22 may attempt to access a file located in the operating system layer 28. The flow starts at start oval 300 and proceeds to step 301 where application 22 begins the attempt to access a file. The flow then proceeds to decision diamond 302 where the question is asked, does the Java file instance exist already. If yes, the flow continues at step 313 where the Java file instance is utilized. From step 313 the flow then continues to decision diamond 314 where the question is asked, is the native file already open. If the native file is already open, the flow continues at end oval 322. However, if the native file is not already open, the flow continues at decision diamond 315 where the question is asked, is the program able to have one more simultaneously open file. If the answer is no, the flow continues at step 316 where one of the current files is closed. However, if the answer to decision diamond 315 is yes, the flow continues at decision diamond 317. From step 316 the flow also continues to decision diamond 317 where the question is asked, does the Java file instance have the unique identifier. If the answer is no, the flow continues to step 318 where the directory file is opened. From step 318 the flow continues to step 319 where the full name is matched to the shortened name in the directory table. From step 319 the flow continues to step 320 where the directory file is closed. From step 320 the flow continues to step 321 where the corresponding native file is opened. A yes answer to decision diamond 317 also continues to step 321. From step 321 the flow continues to step 307.

If the answer to decision diamond 302 is no, the flow continues at step 303 where a Java file instance is created. From step 303 the flow continues to decision diamond 304 where the question is asked, is the system able to have one more simultaneously open file. If the answer is no, the flow continues to step 305 where one of the current files is closed. From step 305 the flow continues to step 306. If the answer to decision diamond 304 is yes, the flow continues to step 306 where the directory file is opened. From step 306 the flow continues to step 310 where an entry in the directory table with a shortened version of the file name is created. From step 310 the flow continues to step 311 where the directory file is closed. From step 311 the flow continues to step 312 where the native file is created or opened. From step 312 the flow continues to step 307 where the unique identifier is cached in the Java file instance. From step 307 the flow continues to step 308 where the current file offset is cached in the Java file instance. From step 308 the flow continues to step 309 where the file handle is cached in the Java file instance. From step 309 the flow continues to end oval 322.

Figure 4:
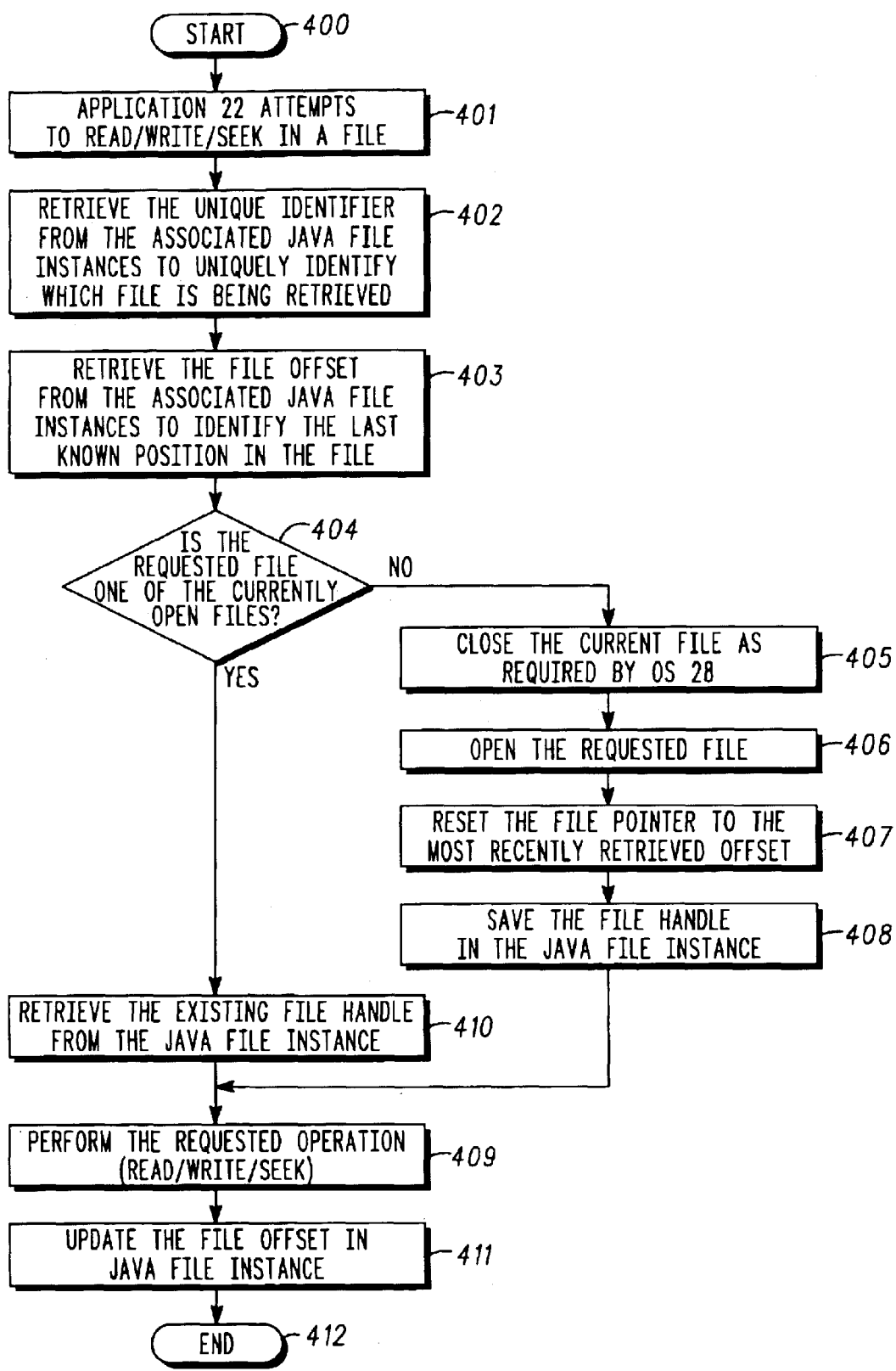
FIG. 4 illustrates, in flow diagram form, one embodiment of software to read or write or seek in an open file in accordance with the present invention.

FIG. 4 illustrates one embodiment of an attempt by application 22 to read or write or seek in a file that application 22 considers to be open. The flow starts at start oval 400 and then proceeds to step 401 where the attempt by application 22 to read, write, or seek in a file is begun. From step 401 the flow proceeds to step 402 where the unique identifier is retrieved from the associated Java file instance to uniquely identify which file is being retrieved. From step 402 the flow proceeds to step 403 where the file offset is retrieved from the associated Java file instance to identify the last known position in the file. From step 403 the flow continues to decision diamond 404 where the question is asked, is the requested file one of the currently open files. If yes, the flow proceeds from decision diamond 404 to step 410 where the existing file handle is retrieved from the Java file instance. From step 410 the flow then proceeds to step 409. If the answer to decision diamond 404 is no, the flow proceeds to step 405 where the current file is closed as required by operating system 28. In one embodiment of the invention, step 405 is equivalent to steps 315 and 316 in FIG. 3. Alternate embodiments may implement step 405 and steps 315 and 316 in a different manner. From step 405 the flow then continues to step 406 where the requested file is opened. From step 406 the flow then proceeds to step 407 where the file pointer to the most recently retrieved offset is reset. From step 407 the flow then continues to step 408 where the file handle is saved in the Java file instance. From step 408 the flow then proceeds to step 409 where the requested operation is performed (i.e. a read operation, a write operation, or a seek operation). From step 409 the flow then proceeds to step 411 where the file offset is updated in the Java file instance. From step 411 the flow then proceeds to end oval 412 where the flow ends.

FIG. 5 illustrates one embodiment of a portion of software 20 of FIG. 2. In one embodiment, FIG. 5 illustrates a MIDP record management system (RMS) which is a portion of software 38 (See FIG. 2). RMS 38 communicates with file table 506. Directory table 506 is a portion of software 36 (See FIG. 2). In one embodiment directory table 506 includes one or more Java names 599 for which the name stock_quotations 514 is an example. Directory table 506 also includes one or more shortened names 510 of which F_1 516 is an example. Directory table 506 also includes one or more directories 512 of which midlet suite 1 (40) (See FIG. 2) is an example. The portion of software 20 illustrated in FIG. 5 includes operating system 28. In one embodiment of the present invention, operating system 28 includes a file having the name F_1 29. The portion of software 20 illustrated in FIG. 5 also includes a Java file instance 504 which is a portion of software 30 (See FIG. 2). The connecting arrows illustrated in FIG. 5 are intended to illustrate the manner in which execution flow transitions from various pieces of software within software 20.

FIG. 6 illustrates the manner in which the steps of FIGS. 3A and 3B and the software portions of FIG. 5 correspond to each other during execution of software 20. Letter A illustrated in FIG. 5 corresponds to step 301 in FIG. 3A and corresponds to the activity in which the Java RMS attempts to access a file. The letter B in FIG. 5 corresponds to steps 318–320 in FIG. 3B and corresponds to the activity of a lookup operation being performed to retrieve the shortened version of the file name. Letter C in FIG. 5 corresponds to step 321 in FIG. 3B and corresponds to the activity in which a native call is made to the operating system 28 to open the file named F_1. Letter D in FIG. 5 corresponds to steps 307–309 in FIG. 3A and corresponds to the activity in which software 36 updates a Java file instance which contains the file handle, the offset, and the unique identifier. Letter E in FIG. 5 corresponds to step 322 in FIG. 3B and corresponds to the activity in which the Java file instance is passed back to the RMS.

Further Description of Operation

Referring again to FIG. 5, some operating systems 28 limit the number of characters allowed in a file name (Java name 599). Thus in some embodiments the name selected by the Java code (i.e. Java name 599) contains too many characters to meet the requirements of operating system 28. In order to reconcile the demands of a higher level, such as the MIDP 24 specification requirements, with the requirements of a lower level operating system 28, it is necessary to find a way to meet the requirements of both.

In one embodiment the present invention creates a directory file 37 within a portion of software 36. This directory file 37 contains a table 506 which stores the Java name 599 allowed by the higher level MIDP 24 specification along with a corresponding shortened name 510 which is created by software 36 in order to meet the requirements of operating system 28. Directory table 506 thus stores a shortened name 510 which has been created for each corresponding Java name 599. In addition, directory table 506 stores at least one directory 512 for each Java name 599 and shortened name 510 pair. In one embodiment of the present invention directory 512 stores the next parent directory in the hierarchy. Note that storing the directory 512 information along with the Java name 599 and shortened name 510 pair allows applications 22 to use a hierarchical system. Note that other portion of software 20 (e.g. software 38) may also use this hierarchical file system. Note that the addition of directory table 506 allows various portions of software 20 to use file names of various lengths and thus meet the requirement of divergent specifications (e.g. MIDP 24 and OS 28). In one embodiment of the present invention Java name 599 may be written in Unicode format. In some embodiments of the present invention the shortened name 510 may be written in an ASCII format. Note that alternate embodiments of the present invention may use alternate formats for Java name 599 and shortened name 510 other than Unicode and ASCII.

In one embodiment of the present invention the Java name 599 is translated to the shortened name 510 by performing a lookup operation in directory table 506. Java name 599 is compared against the Java name entries in directory table 506 until an exact match is found and the corresponding shortened name entry retrieved. Note that alternate embodiments of the present invention may use alternate methods of translation other than a table lookup.

Referring to FIG. 3A, step 307 illustrates where software 36 caches a unique identifier in the Java file instance. Referring now to FIG. 5, unique identifier 507 illustrates how this value is stored in the Java file instance 504 which is a portion of software 30. Referring again to FIG. 3A, step 308 illustrates how software 36 caches the current file offset in the Java file instance. Referring again to FIG. 5, file offset 508 is stored in Java file instance 504, which is a portion of software 30. Referring again to FIG. 3A, step 309 illustrates how software 36 caches the file handle in the Java file instance. Referring again to FIG. 5, file handle 509 is stored in Java file instance 504, which is a portion of software 30. By storing the file offset 508, software 36 is able to concurrently open more files than specified by the operating system 28 specification. For some operating system 28 specifications, only one file may be opened at a time. For such operating systems 28, it is very advantageous to emulate the ability to concurrently open a plurality of files.

By storing file offset 508 in Java file instance 504, software 36 effectively uses a private Java field to store platform specific information about the underlying file. In one embodiment file offset 508 is this platform specific information that is stored in Java file instance 504. Alternate embodiments of the present invention may store any type of platform specific information in Java file instance 504 for other purposes. Note that there are unique advantages for storing platform specific information in Java file instance 504. One such advantage is the fact that the private Java field allows precise allocation of memory and thus can be very memory efficient because the private Java field utilizes the Java programming language's automatic storage management (i.e. garbage collection). Thus software 36, which is written in the native programming language, is able to utilize a portion of software 30 which has been allocated to the Java programming language (i.e. the Java file instance 504). Note that in one embodiment of the present invention the native programming language may be the C programming language. Thus software written in C code may use memory or storage allocated to Java code to store file offset or pointer information which is specific to operating system 28. Note that the terms file offset and file position have been used interchangeably herein.

Referring to FIG. 3B, decision diamond 314 checks to see if the native file is already open. Referring now to FIG. 5, in one embodiment this check is performed by retrieving file handle 509 from Java file instance 504. If the native file is already open, then file handle 509 may be used directly by software 36 in order to access the file in operating system 28. However if the native file is not open, then file handle 509 cannot be used and the flow continues at decision diamond 317 where the question is asked, does the Java file instance have the unique identifier 507. If the unique identifier 507 is stored in Java file instance 504 (See FIG. 5) then the unique identifier 507 is used to recreate the short name 510 by concatenating the unique identifier 507 with a constant name value stored in software 36. As an example, unique identifier 507 may be the number 1 and the constant value stored in software 36 may be the letter F, thus the shortened name 510 created by software 36 is F_1. Note that when the unique identifier 507 is available, the shortened name 510 can be obtained without the need to retrieve the Java name 599 and translate it to the shortened name 510. Note that if a file handle 509 and a unique identifier 507 are not stored in Java file instance 504, then a table lookup in directory table 506 may be performed.

Alternate embodiments of the present invention may store different values other than a unique identifier, a file offset, and a file handle in Java file instance 504. There may be other usages for allowing a native programming language to store values in storage or memory which has been allocated for usage by Java code. Note that in the present invention the values (e.g. 507–509) stored by the native programming language in the Java file instance 504 may be used only by the native programming language and not by the Java programming language.

It is unusual for a programming language A to store information in memory allocated to programming language B where programming language B never uses the stored information. However this allows some of the functions of programming language B (e.g. garbage collection) to be used to manage the removal and reallocation of the memory and storage allocated to programming language B.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. In a device that uses a Java programming language and a second programming language, a method of emulating more simultaneously open files in the device than is permitted by an operating system of the device comprising:

while running a predetermined program in the Java programming language, attempting to access a file stored within the device;

determining whether the file is already open from prior execution;

if the file is open, access to the file proceeds;

if the file is not open, a determination is made by the device of a number of files the device permits to be simultaneously open;

if the number is not exceeded by opening the file, the file is opened;

if the number is exceeded by opening the file, the device emulates having more files open than the number allowed by:

(1) saving a file position for at least one open file, the file position designating where a next byte in the at least one open file would be accessed;

(2) closing the at least one open file; and (3) opening the file;

wherein subsequent accesses to the at least one open file that has been closed are made transparently to the predetermined program in the Java programming language by closing at least one currently open file, retrieving the file position previously saved, and opening and restoring the file position for that file.

2. The method of claim 1 further comprising:

saving the file position in storage allocated for usage by Java code.

3. The method of claim 1 further comprising:

implementing the second programming language as C programming language.

4. The method of claim 1 further comprising:

providing a table;

storing arbitrarily long file names in a first format;

storing corresponding shortened names in a second format not exceeding a maximum number of characters; and translating from the first format to the second format when a file is initially opened under control of the Java programming language, the translating being implemented transparent to any Java programming language application so that the Java programming language does not utilize the corresponding shortened names.

5. The method of claim 4 further comprising:

performing the translating only when the operating system does not permit file names having a length exceeding a predetermined maximum number of characters.

6. The method of claim 4 further comprising:

performing the translating only when the operating system does not support first format file names.

7. The method of claim 4 further comprising:

placing a unique identifier within predetermined positions of the shortened names to identify which file is being retrieved by the operating system.

8. The method of claim 7 further comprising:

using the unique identifier to bypass the translating of the first format to the second format when a predetermined file is reopened after being previously closed.

9. The method of claim 1 further comprising:

providing a table;

storing a directory in the table, the directory indicating a Java language application suite corresponding to a predetermined file; and using the directory in the table to distinguish files of the same name belonging to different Java language application suites.

10. The method of claim 1 further comprising:

using storage allocated for use by Java code to contain variables such as file position needed by the second programming language.

11. The method of claim 10 further comprising:

using the variables to track the current position within an open file and to reopen and reposition the file if the file is temporarily closed.

12. The method of claim 10 further comprising:

using automatic memory management features of the Java programming language including garbage collection to reclaim storage when the file is no longer in use.

13. The method of claim 1 further comprising:

implementing the device as a portable, wireless device.

14. A method of interfacing a file system in a device that uses both a Java programming language and another programming language, comprising:

selecting a predetermined operating system;

overlying a Java virtual machine for executing programs within the operating system in the another programming language;

overlying the operating system with a file system interface layer;

overlying libraries to the Java virtual machine and the file system interface layer, the libraries running in the Java programming language;

using the file system interface to determine if a maximum number of open Java files has been exceeded, and if so, storing position information of at least one open Java file in a currently open Java application prior to closing the at least one open Java file; and subsequently reopening the at least one open Java file by restoring the position information transparent to any Java application.

15. The method of claim 14 further comprising:

providing a table;

storing a directory in the table, the directory indicating a Java language application suite corresponding to a predetermined file; and using the directory in the table to distinguish files of the same name belonging to different Java language application suites.

16. The method of claim 15 further comprising:

using storage allocated for use by Java code to store variables needed by the another programming language.

17. The method of claim 16 further comprising:

using the variables to track the current position within an open file and to reopen and reposition the file if the file is temporarily closed.

18. The method of claim 14 further comprising:

providing a table;

storing arbitrarily long file names in a first format;

storing corresponding shortened names in a second format not exceeding a maximum number of characters; and translating from the first format to the second format when a file is initially opened under control of the Java programming language, the translating being implemented transparent to any Java programming language application so that the Java programming language does not utilize the corresponding shortened names.

19. The method of claim 18 further comprising:

placing a unique identifier within predetermined positions of the shortened names to identify which file is being retrieved by the operating system.

20. The method of claim 19 further comprising:

using the unique identifier to bypass the translating of the first format to the second format when a predetermined file is reopened after being previously closed.

* * * * *